US011063657B2

(12) United States Patent
Fujishiro et al.

(10) Patent No.: US 11,063,657 B2
(45) Date of Patent: Jul. 13, 2021

(54) RELAY RADIO TERMINAL AND RADIO TERMINAL

(71) Applicant: KYOCERA Corporation, Kyoto (JP)

(72) Inventors: Masato Fujishiro, Yokohama (JP); Hiroyuki Adachi, Kawasaki (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/691,919

(22) Filed: Nov. 22, 2019

(65) Prior Publication Data

US 2020/0091991 A1   Mar. 19, 2020

Related U.S. Application Data

(63) Continuation of application No. PCT/JP2018/020025, filed on May 24, 2018.

(Continued)

(51) Int. Cl.
*H04B 7/155* (2006.01)
*H04W 68/00* (2009.01)
*H04W 84/04* (2009.01)
*H04W 8/24* (2009.01)
*H04W 88/04* (2009.01)

(52) U.S. Cl.
CPC .......... *H04B 7/15507* (2013.01); *H04W 8/24* (2013.01); *H04W 68/005* (2013.01); *H04W 84/042* (2013.01); *H04W 88/04* (2013.01)

(58) Field of Classification Search
CPC .......... H04B 7/026; H04B 7/14; H04B 7/145; H04B 7/15; H04B 7/155; H04B 7/15507; H04B 7/15528; H04B 7/1555; H04B 7/15557; H04W 8/24; H04W 68/005; H04W 68/02; H04W 72/0406;
(Continued)

(56) References Cited

U.S. PATENT DOCUMENTS 6,678,341 B1 * 1/2004 Miyake ................. H04W 88/02
370/338
10,154,532 B2 * 12/2018 Yamazaki ............. H04W 76/10
(Continued)

OTHER PUBLICATIONS

Intel Corporation, "Report of email discussion [97#66][LTE/FeD2D]—Paging", 3GPP TSG RAN WG2#97bis, R2-1702987, Apr. 3-7, 2017, pp. 1-26, Spokane, WA, USA.
(Continued)

*Primary Examiner* — Yuwen Pan
*Assistant Examiner* — Paul P Tran
(74) *Attorney, Agent, or Firm* — Studebaker & Brackett PC

(57) ABSTRACT

A relay radio terminal according to a first aspect performs a process for relaying communication between a base station and a remote radio terminal in a mobile communication system. In a state in which the relay radio terminal is in an idle mode and an end-to-end radio link between the relay radio terminal and the remote radio terminal is established, the controller is configured to perform a process of receiving, from the base station, a paging message including an identifier of the remote radio terminal as a call destination in a paging reception opportunity of the relay radio terminal, and a process of determining whether not only the remote radio terminal but also the relay radio terminal is called, in response to reception of the paging message.

2 Claims, 13 Drawing Sheets

Related U.S. Application Data

(60) Provisional application No. 62/510,942, filed on May 25, 2017.

(58) Field of Classification Search
CPC . H04W 72/1278; H04W 76/10; H04W 76/14; H04W 84/042; H04W 88/04; H04W 88/06
See application file for complete search history.

(56) References Cited

U.S. PATENT DOCUMENTS

| | | | |
|---|---|---|---|
| 2004/0043782 A1* | 3/2004 | Gupta | H04W 88/02 455/517 |
| 2012/0218934 A1* | 8/2012 | Takehana | H04W 84/047 370/315 |
| 2012/0231801 A1* | 9/2012 | Nakatsugawa | H04B 7/155 455/445 |
| 2017/0099581 A1* | 4/2017 | Yang | H04W 36/14 |
| 2017/0142686 A1* | 5/2017 | Zhang | H04L 67/303 |
| 2017/0195987 A1* | 7/2017 | Zarifi | H04W 68/02 |
| 2017/0366919 A1* | 12/2017 | Lim | H04W 4/70 |
| 2019/0357177 A1* | 11/2019 | Kuang | H04B 7/2606 |

OTHER PUBLICATIONS

LG, "Report of email discussion [97bis#18][LTE/FeD2D]—System Information", 3GPP TSG RAN WG2#98, R2-1705767, May 15-19, 2017, pp. 1-15, Hangzhou, China.

Intel Corporation, "Signaling considerations in FeD2D", 3GPP TSG RAN WG2 Meeting #96, R2-167773, Nov. 14-18, 2016, pp. 1-5, Reno, NV, USA.

* cited by examiner

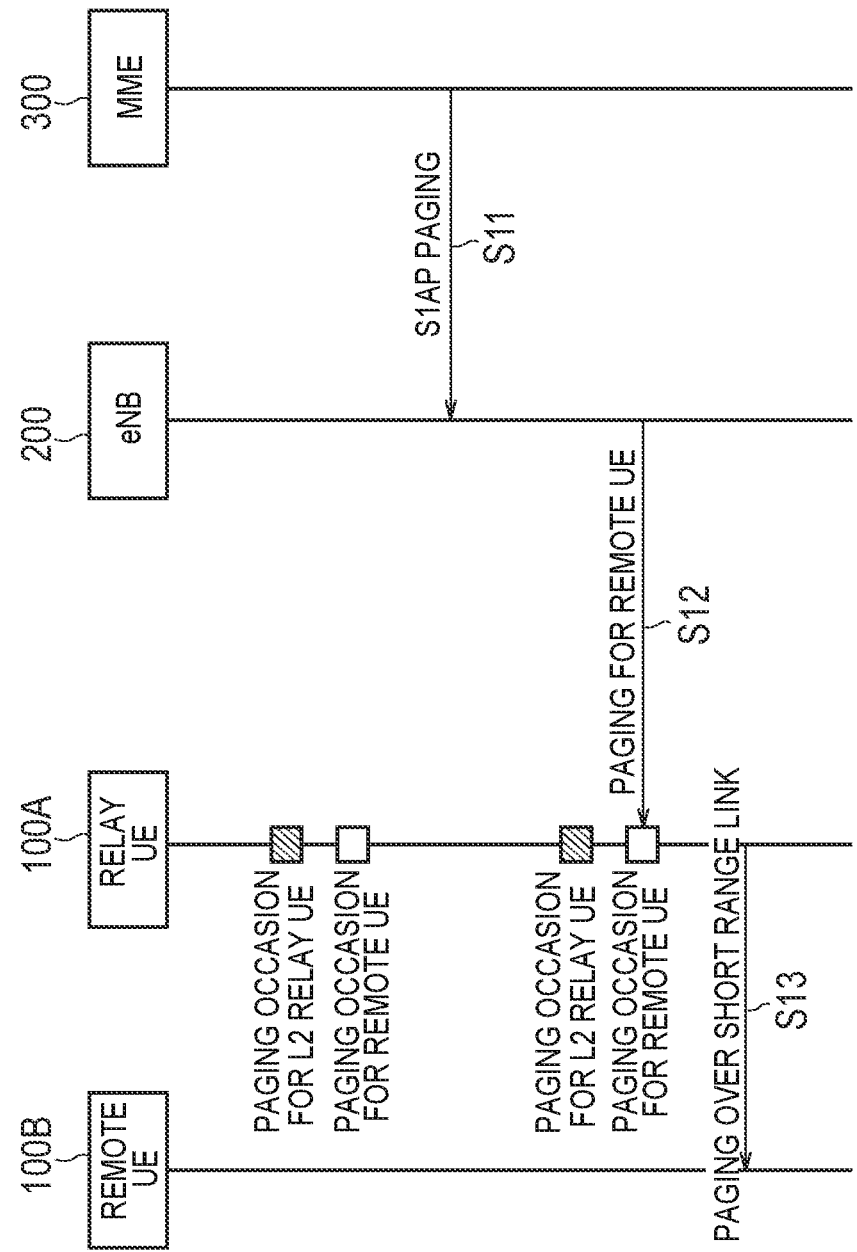

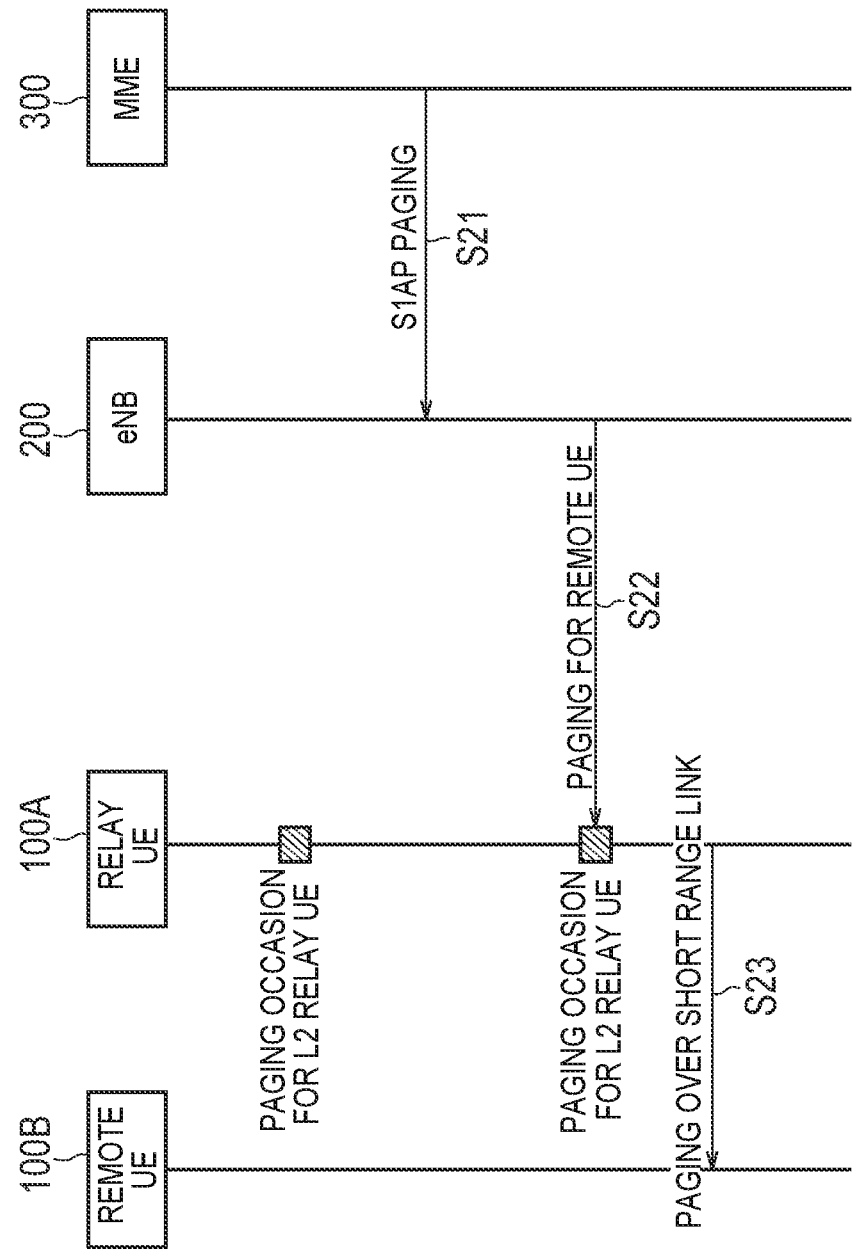

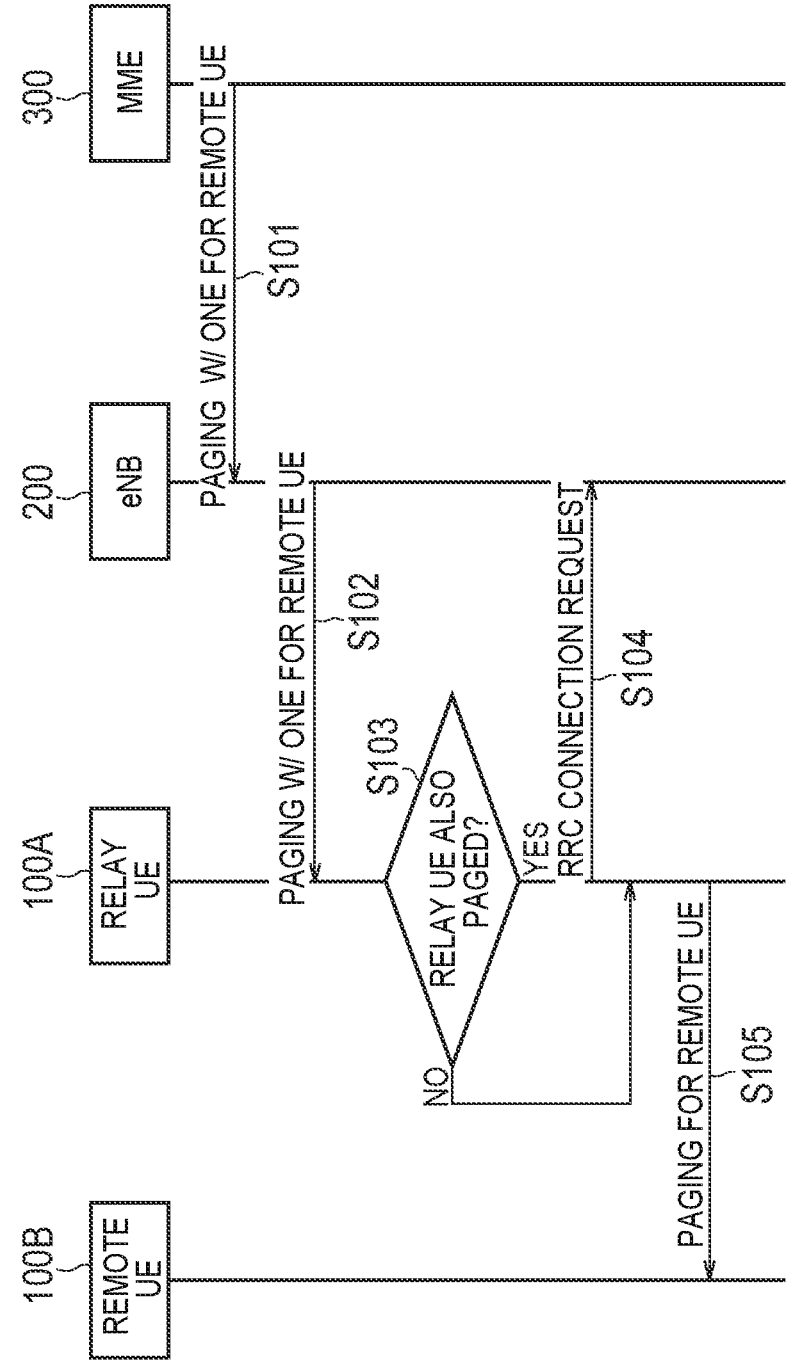

FIG. 10

```
Paging ::=                  SEQUENCE {
    pagingRecordList            PagingRecordList             OPTIONAL,   -- Need ON
    systemInfoModification      ENUMERATED {true}            OPTIONAL,   -- Need ON
    etws-Indication             ENUMERATED {true}            OPTIONAL,   -- Need ON
    nonCriticalExtension        Paging-v890-IEs              OPTIONAL
}
[...]
PagingRecordList ::=   SEQUENCE (SIZE (1..maxPageRec)) OF PagingRecord PagingRecord ::=   SEQUENCE {
    ue-Identity            PagingUE-Identity,
    cn-Domain              ENUMERATED {ps, cs},
    ...,
    remoteUE-Identity      PagingUE-Identity  ENUMERATED (True)
    (relayUE-Paging)
}

PagingUE-Identity ::=   CHOICE {
    s-TMSI         S-TMSI,
    imsi           IMSI,
    ...
}

IMSI ::=        SEQUENCE (SIZE (6..21)) OF IMSI-Digit

IMSI-Digit ::=  INTEGER (0..9)
```

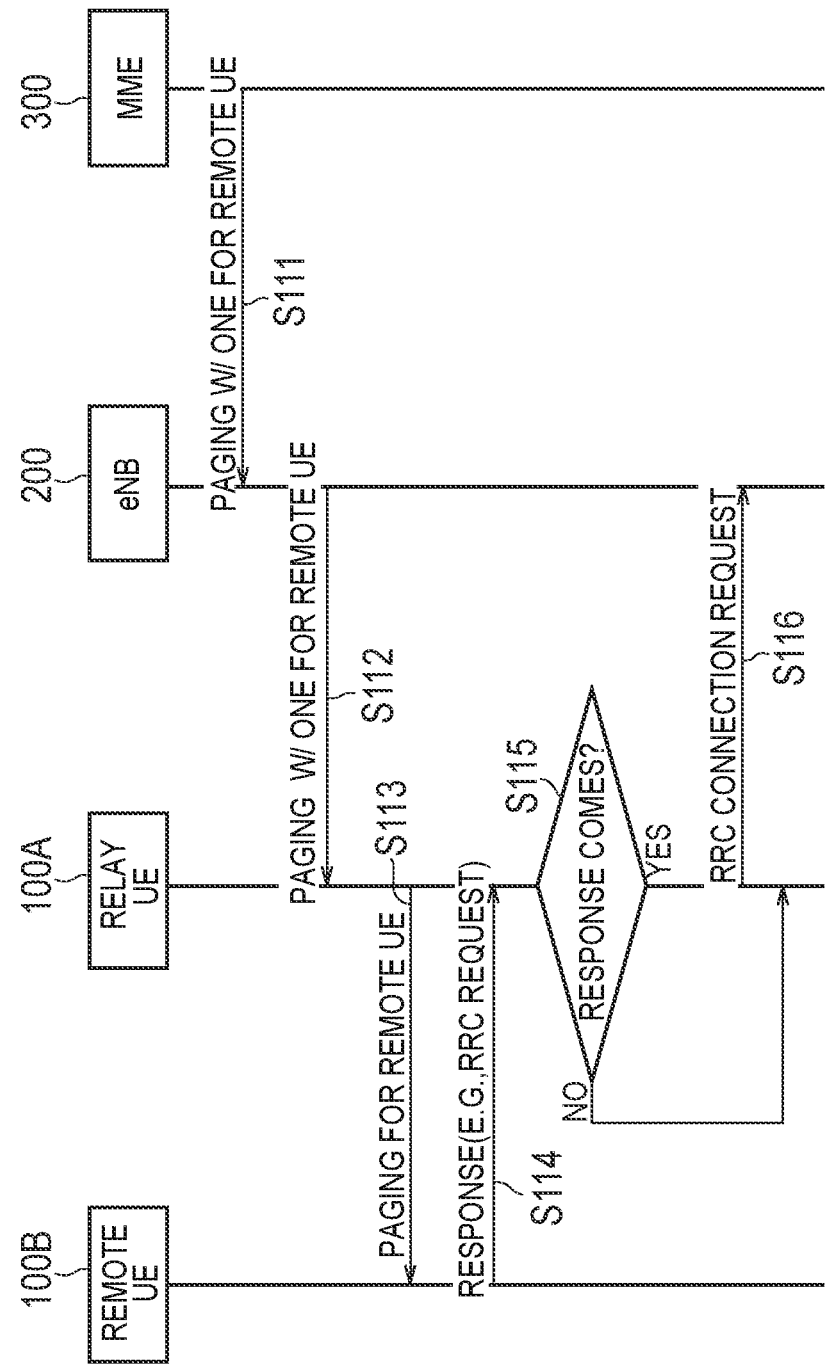

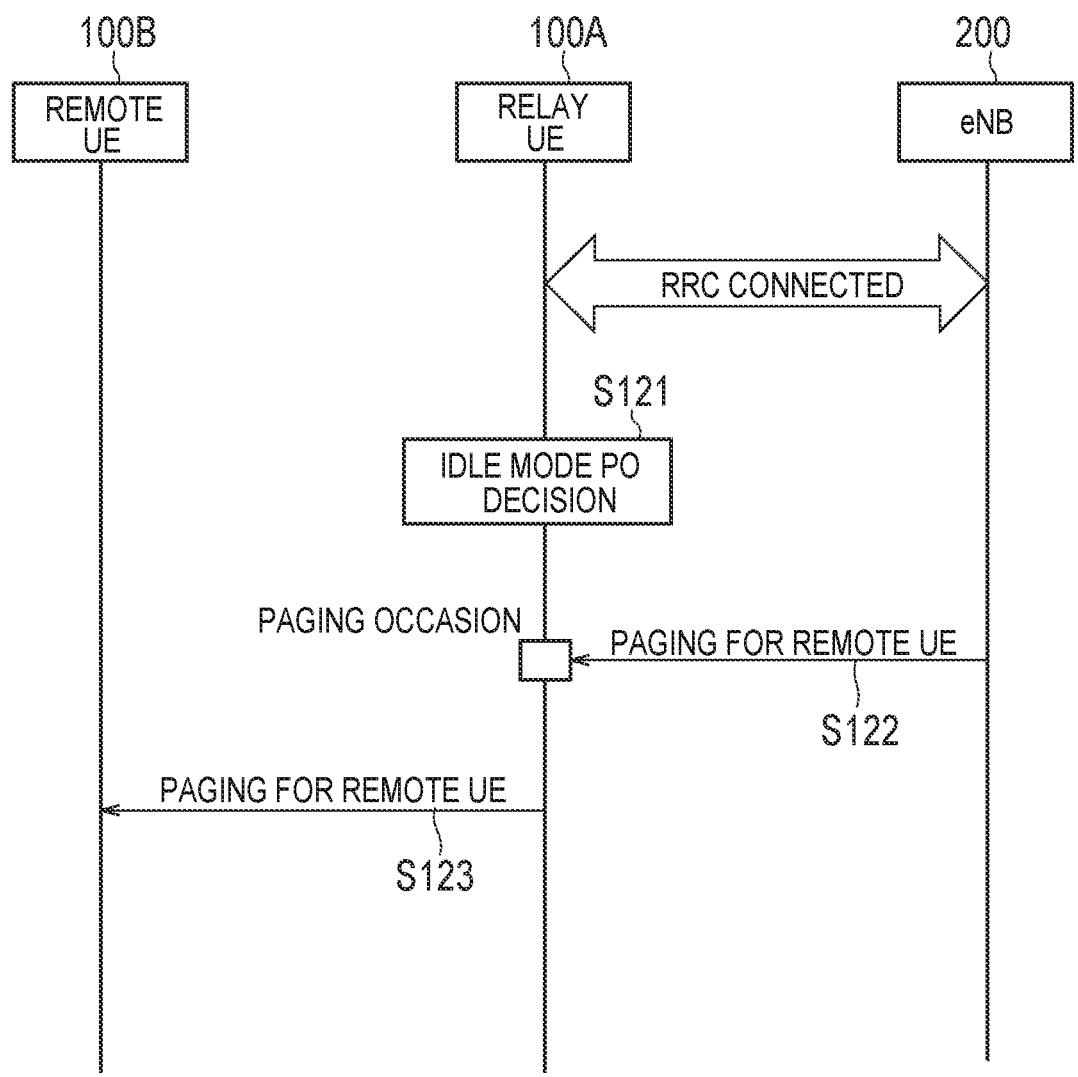

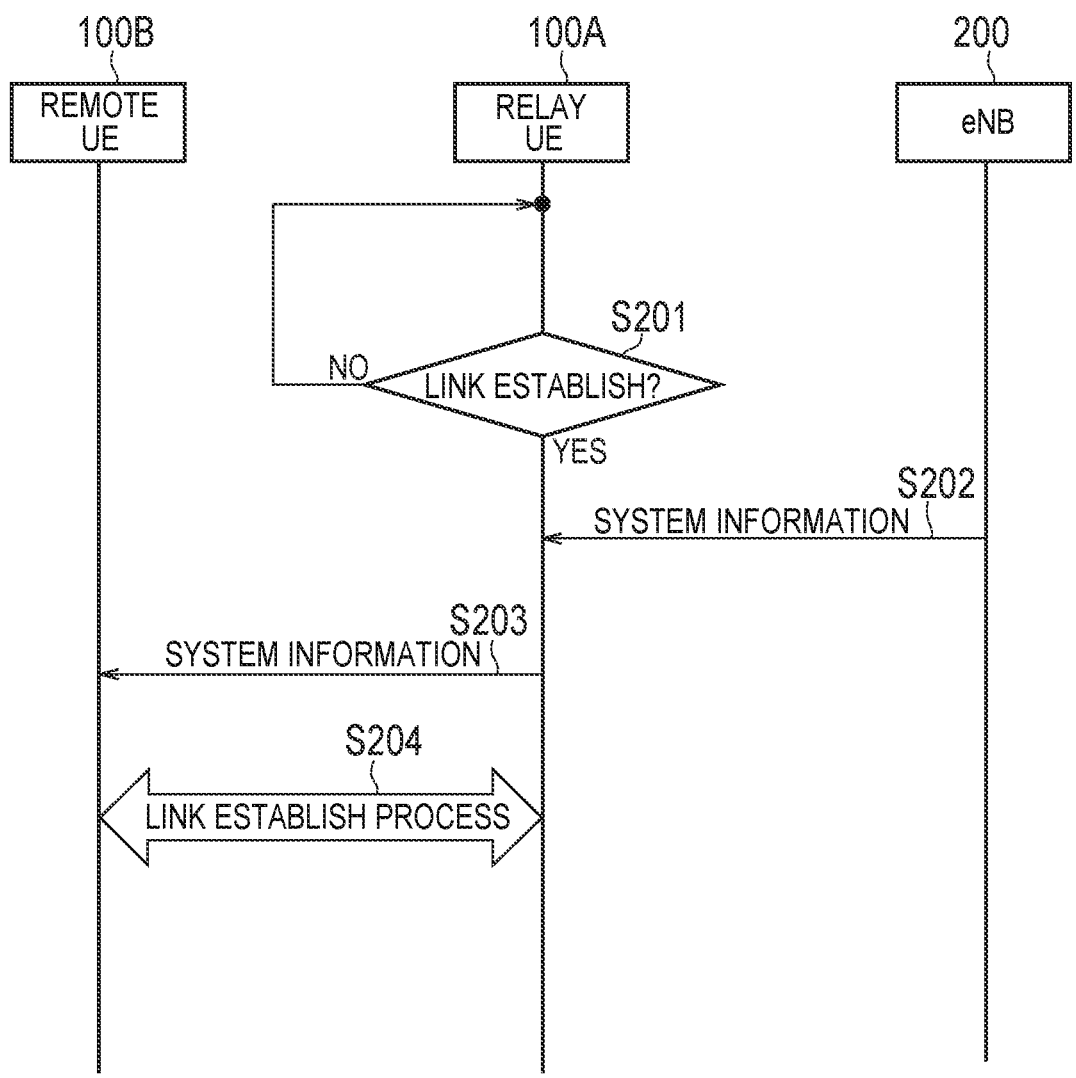

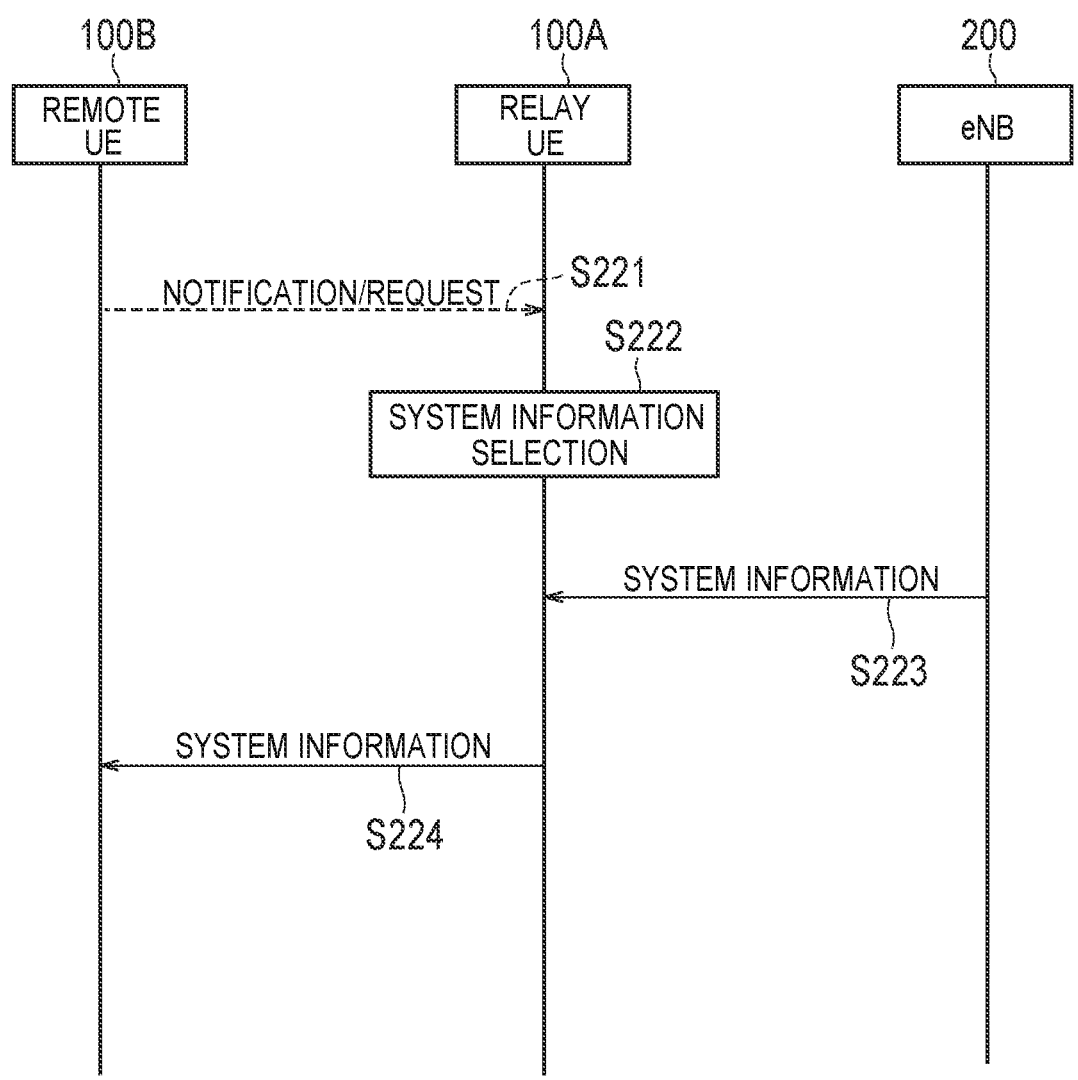

RELAY RADIO TERMINAL AND RADIO TERMINAL

RELATED APPLICATIONS

The present application is a continuation based on PCT Application No. PCT/JP2018/020025, filed on May 24, 2018, which claims the benefit of U.S. provisional application No. 62/510,942 (filed on May 25, 2017). The content of which is incorporated by reference herein in their entirety.

TECHNICAL FIELD

The present invention relates to a relay radio terminal used in a mobile communication system.

BACKGROUND ART

The 3rd Generation Partnership Project (3GPP), a standardization project for mobile communication systems, formulates the specifications of a relay function in which a relay radio terminal provides connectivity with a base station (network) to a remote radio terminal by using direct communication between the relay radio terminal and the remote radio terminal. Such a relay function may be referred to as "ProSe UE-to-Network Relay". In order to upgrade the relay function, a technique for enabling a relay radio terminal to relay a paging message and/or system information transmitted by a base station to a remote radio terminal has been studied (see Non patent Literature 1).

SUMMARY

A relay radio terminal according to a first aspect performs a process for relaying communication between a base station and a remote radio terminal in a mobile communication system. In a state in which the relay radio terminal is in an idle mode and an end-to-end radio link between the relay radio terminal and the remote radio terminal is established, the controller is configured to perform a process of receiving, from the base station, a paging message including an identifier of the remote radio terminal as a call destination in a paging reception opportunity of the relay radio terminal, and a process of determining whether not only the remote radio terminal but also the relay radio terminal is called, in response to reception of the paging message. The controller is configured to determine that not only the remote radio terminal but also the relay radio terminal is called when one of following conditions is satisfied: an identifier of the relay radio terminal is also included in the paging message as a call destination, an indicator indicating that the relay radio terminal is also called is included in the paging message, and another paging message including an identifier of the relay radio terminal as a call destination is further received in the paging reception opportunity.

A relay radio terminal according to a second aspect comprises a controller configured to perform a process for relaying communication between a base station and a remote radio terminal in a mobile communication system. The controller is configured to perform a process of receiving system information broadcast from the base station, and a process of determining whether or not to relay information included in the system information to the remote radio terminal. The controller is configured to determine to relay information included in the system information to the remote radio terminal when one of following conditions is satisfied: in a state where an end-to-end radio link between the relay radio terminal and the remote radio terminal is not established, the relay radio terminal determines to establish the end-to-end radio link, in a state in which the end-to-end radio link is established, the relay radio terminal detects an update of the system information, and in a state in which the end-to-end radio link is established, the relay radio terminal receives a system information relay request from the remote radio terminal.

A first radio terminal according to a third aspect comprises a controller configured to perform a process for relaying communication between a base station and a second radio terminal in a mobile communication system. The controller is configured to perform a process of receiving a plurality system information (system information blocks, SIBs) broadcast from the base station, and a process of transferring part of system information among the plurality of system information to the second radio terminal via an end-to-end radio link with the second radio terminal. The part of system information includes SIB type 18 which is system information on a side link direct communication of 3GPP (LTE) and SIB type 19 which is system information on side link direct discovery of 3GPP (LTE).

BRIEF DESCRIPTION OF DRAWINGS

FIG. 7 is a diagram illustrating a first paging scenario for calling a remote UE.

FIG. 8 is a diagram illustrating a second paging scenario for calling a remote UE.

FIG. 9 is a diagram illustrating a first paging relay operation in an idle mode according to the embodiment.

FIG. 10 is a diagram illustrating a configuration example of a paging message according to an embodiment.

FIG. 11 is a diagram illustrating a second paging relay operation in the idle mode according to the embodiment.

FIG. 12 is a diagram illustrating paging relay operation in a connected mode according to the embodiment.

FIG. 13 is a diagram illustrating a first operation example of system information relay operation according to the embodiment.

FIG. 15 is a diagram illustrating a third operation example of the system information relay operation according to the embodiment.

DESCRIPTION OF EMBODIMENTS

(1) Mobile Communication System

Figure 1:
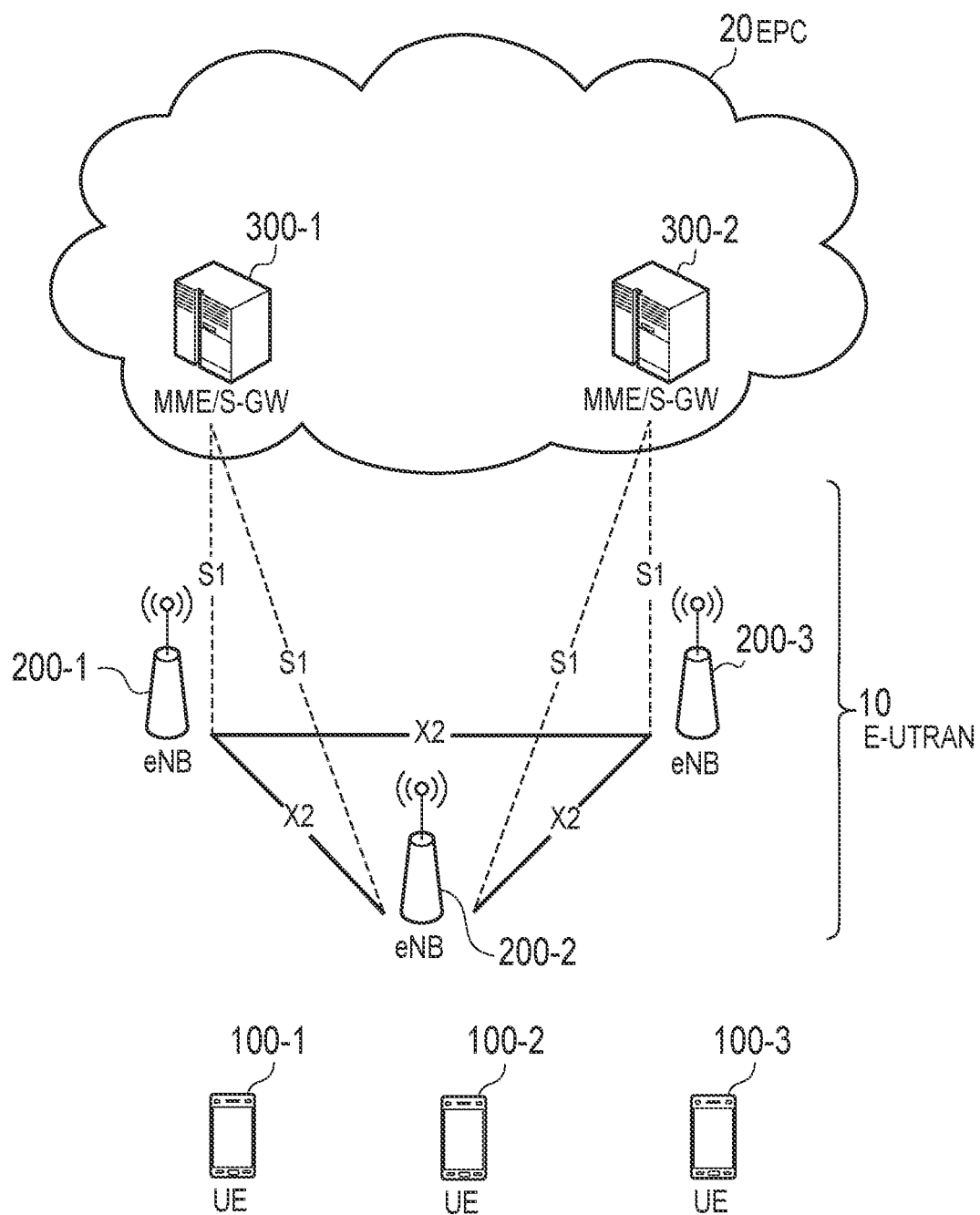
FIG. 1 is a diagram illustrating a configuration of an LTE system (mobile communication system) according to an embodiment.

The configuration of a mobile communication system according to an embodiment is described. FIG. 1 is a view illustrating the configuration of a Long Term Evolution (LTE) system which is the mobile communication system according to the embodiment. The LTE system is a mobile communication system which conforms to a 3GPP standard.

As illustrated in FIG. 1, the LTE system includes radio terminals (UE: User Equipment) 100, a radio access network (E-UTRAN: Evolved-UMTS Terrestrial Radio Access Network) 10, and a core network (EPC: Evolved Packet Core) 20.

An UE 100 is a mobile communication apparatus. The UE 100 is, for example, a mobile phone terminal, a tablet terminal, a card type terminal, an in-vehicle type terminal, or the like. The UE 100 performs radio communication with an eNB 200 that manages a cell (serving cell) in which the UE 100 exists.

The E-UTRAN 10 includes the base stations (eNBs: evolved Node-Bs) 200. The eNBs 200 are interconnected with each other via X2 interfaces. The eNB 200 manages one or a plurality of cells. The eNB 200 performs radio communication with the UE 100 which establishes connection with the own cell. The eNB 200 has a radio resource management (RRM) function, a routing function of user data (hereinafter, simply referred to as "data"), a measurement control function for a mobility control and scheduling and the like. "Cell" is used as a term indicating a minimum unit of a radio communication area. The "Cell" is also used as a term indicating a function or a resource for performing radio communication with the UE 100.

An EPC 20 includes a mobility management entity (MME) and a serving gateway (S-GW) 300. The MME performs various mobility control and the like with respect to the UE 100. The MME manages information on a tracking area (TA) in which the UE 100 exists by communicating with the UE 100 using non-access stratum (NAS) signaling. The tracking area is an area including a plurality of cells. The S-GW performs data transfer control. The MME and the S-GW are connected to the eNB 200 via an S1 interface.

Figure 2:
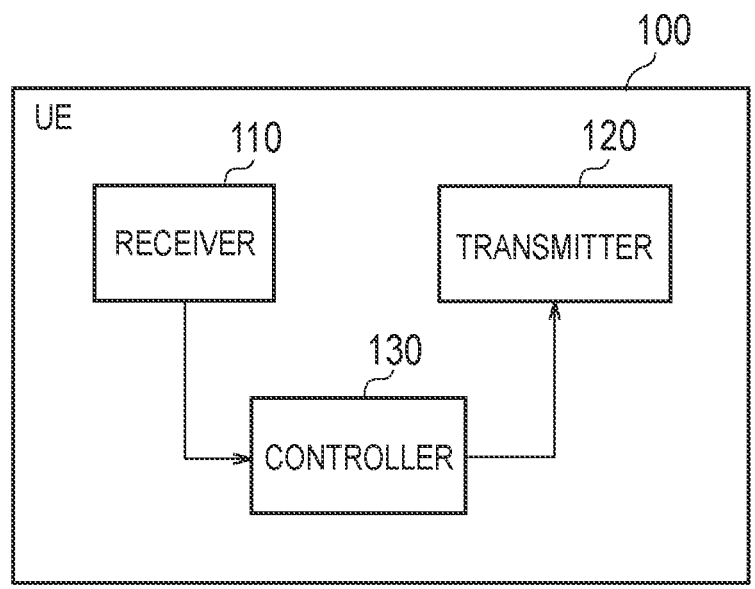
FIG. 2 is a diagram illustrating a configuration of a UE (radio terminal) according to the embodiment.

FIG. 2 is a view illustrating the configuration of the UE 100 (radio terminal). As illustrated in FIG. 2, the UE 100 includes a receiver 110, a transmitter 120, and a controller 130.

The receiver 110 performs various receptions under a control of the controller 130. The receiver 110 includes an antenna and a reception device. The reception device outputs a radio signal which the antenna receives to the controller 130 after converting the radio signal into a baseband signal (reception signal).

The transmitter 120 performs various transmissions under a control of the controller 130. The transmitter 120 includes an antenna and a transmission device. The transmission device transmits a baseband signal (transmission signal) which the controller 130 outputs from the antenna after converting the baseband signal into a radio signal.

The controller 130 performs various controls in the UE 100. The controller 130 includes at least one processor and a memory. The memory stores programs executed by the processor and information used in processing performed by the processor. The processor may include a baseband processor and a Central Processing Unit (CPU). The baseband processor performs modulation/demodulation, coding/decoding and the like of the baseband signal. The CPU performs various processing by executing programs stored in the memory. The processor performs processing described later.

Figure 3:
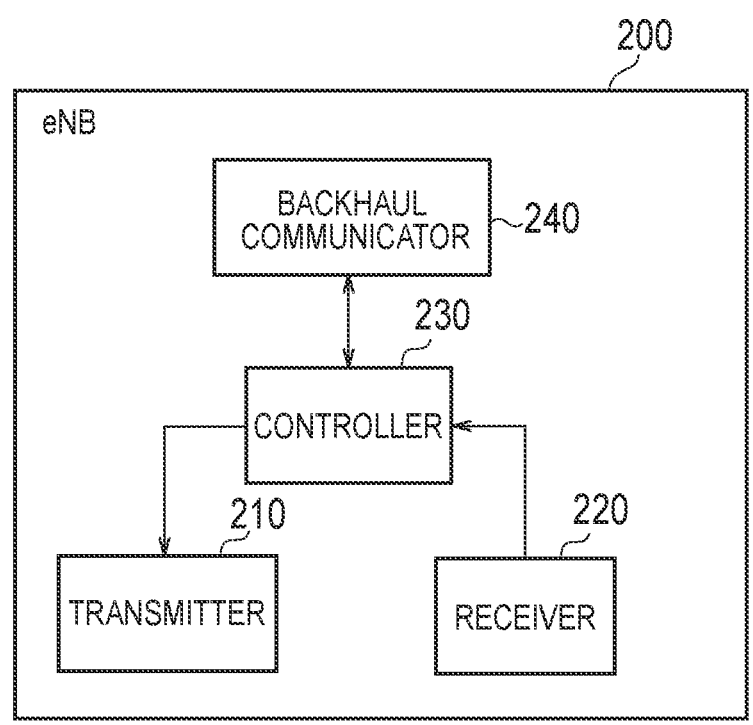
FIG. 3 is a diagram illustrating a configuration of an eNB (base station) according to the embodiment.

FIG. 3 is a view illustrating the configuration of the eNB 200 (base station). As illustrated in FIG. 3, the eNB 200 includes a transmitter 210, a receiver 220, a controller 230, and a backhaul communicator 240.

The transmitter 210 performs various transmissions under a control of the controller 230. The transmitter 210 includes an antenna and a transmission device. The transmission device transmits a baseband signal (transmission signal) which the controller 230 outputs from the antenna after converting the baseband signal into a radio signal.

The receiver 220 performs various receptions under a control of the controller 230. The receiver 220 includes an antenna and a reception device. The reception device outputs a radio signal which the antenna received to the controller 230 after converting the radio signal into a baseband signal (reception signal).

The controller 230 performs various controls in the eNB 200. The controller 230 includes at least one processor and a memory. The memory stores programs executed by the processor and information used for processing performed by the processor. The processor may include a baseband processor and a CPU. The baseband processor performs modulation/demodulation, coding/decoding and the like of the baseband signal. The CPU performs various processing by executing programs stored in the memory. The processor performs processing described later.

The backhaul communicator 240 is connected to the neighboring eNB via the X2 interface. The backhaul communicator 240 is connected to the MME/S-GW 300 via the S1 interface. The backhaul communicator 240 is used for communication performed on the X2 interface, communication performed on the S1 interface and the like.

Figure 4:
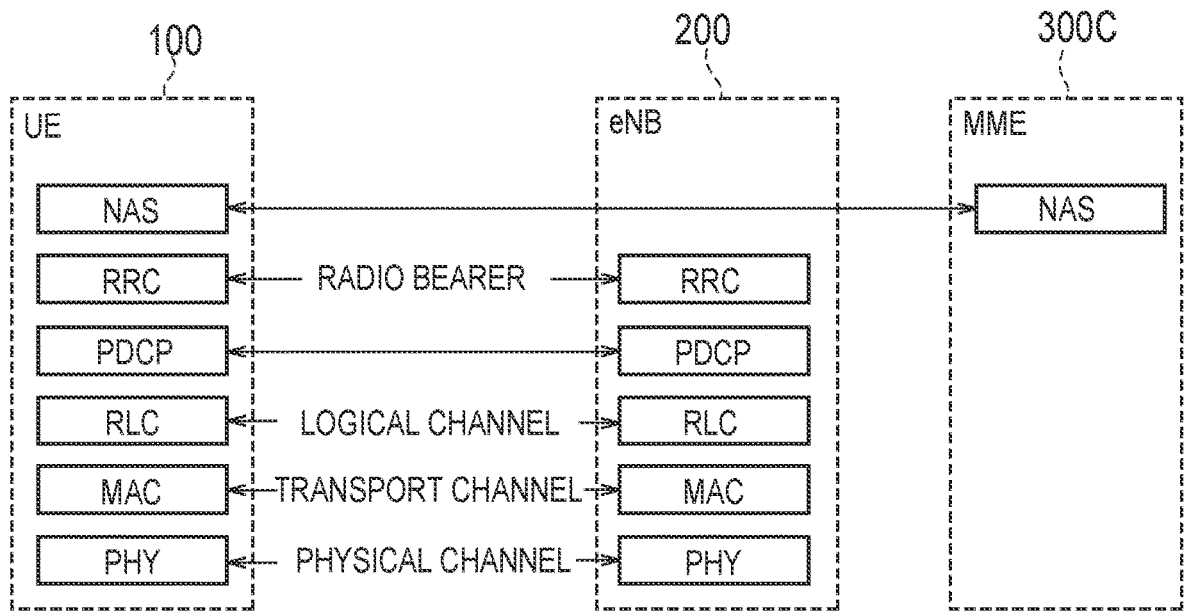
FIG. 4 is a diagram illustrating a protocol stack of a radio interface in the LTE system according to the embodiment.

FIG. 4 is a view illustrating the configuration of a protocol stack of a radio interface in the LTE system. As illustrated in FIG. 4, the radio interface protocol is divided into a first layer to a third layer in an OSI reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer. The PHY layer, the MAC layer, the RLC layer, the PDCP layer, and the RRC layer configure an Access Stratum (AS) layer.

The PHY layer performs coding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs a priority control of data, retransmission processing by a hybrid ARQ (HARD), a random access procedure and the like. Data and control information are transmitted between the MAC layer of the UE 100 and the MAC layer of the eNB 200 via a transport channel. The MAC layer of the eNB 200 includes a scheduler. The scheduler decides a transport format (a transport block size, a modulation/coding method (MCS)) of an uplink and a downlink and an allocation resource block to the UE 100.

The RLC layer transmits data to the RLC layer on a reception side using functions of the MAC layer and the PHY layer. Data and control information are transmitted between the RLC layer of the UE 100 and the RLC layer of the eNB 200 via a logical channel.

A PDCP layer performs header compression/expansion and ciphering/deciphering.

The RRC layer is defined only on a control plane where control information is handled. RRC signaling for various establishment is transmitted between the RRC layer of the UE 100 and the RRC layer of the eNB 200. The RRC layer controls a logical channel, a transport channel, and a physical channel in response to the establishment, the re-establishment and the release of a radio bearer. When the connection (RRC connection) is established between the RRC of the UE 100 and the RRC of the eNB 200, the UE 100 is in an RRC connected mode (connected mode). When the connection (RRC connection) is not established between the RRC of the UE 100 and the RRC of the eNB 200, the UE 100 is in an RRC idle mode (idle mode).

An NAS layer located above an RRC layer performs session management, mobility management, and the like. NAS signaling is transmitted between an NAS layer of the UE 100 and an NAS layer of an MME 300C. The UE 100 has a function of an application layer and the like in addition to a protocol of a radio interface.

Figure 5:
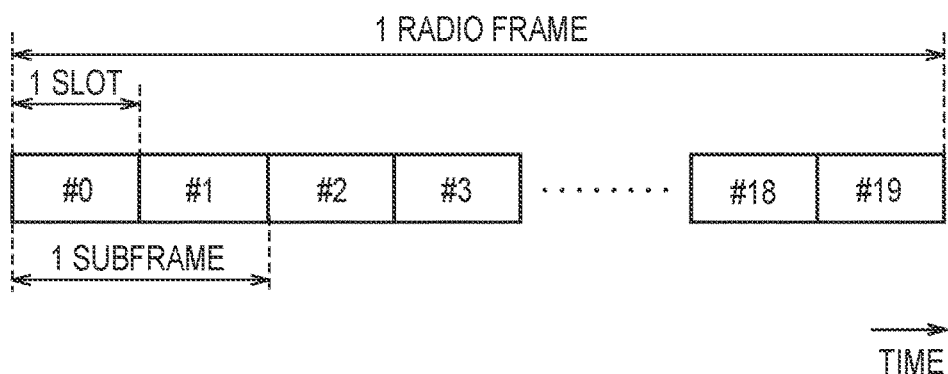
FIG. 5 is a diagram illustrating a configuration of a radio frame of the LTE system according to the embodiment.

FIG. 5 is a diagram illustrating a configuration of a radio frame used in an LTE system. As illustrated in FIG. 5, the radio frame is configured with ten subframes on a time axis. Each of the subframes is configured with two slots on the time axis. A length of each of the subframes is 1 ms. A length of each of the slots is 0.5 ms. Each of the subframes includes a plurality of resource blocks (RBs) on a frequency axis. Each of the subframes includes a plurality of symbols on the time axis. Each of the resource blocks includes a plurality of subcarriers on the frequency axis. Specifically, one RB is configured with twelve subcarriers and one slot. One resource element (RE) is configured with one symbol and one subcarrier. Among radio resources (time and frequency resources) allocated to the UE 100, frequency resources can be identified by a resource block, and time resources can be identified by a subframe (or a slot).

In a downlink, a section of first several symbols of each subframe is a region mainly used as a physical downlink control channel (PDCCH) for transmitting downlink control information. A remaining portion of each subframe is a region that can be used mainly as a physical downlink shared channel (PDSCH) for transmitting downlink data.

In an uplink, both ends in a frequency direction in each subframe are regions used mainly as a physical uplink control channel (PUCCH) for transmitting uplink control information. A remaining portion of each subframe is a region that can be used mainly as a physical uplink shared channel (PUSCH) for transmitting uplink data.

(2) ProSe UE-to-Network Relay

Figure 6:
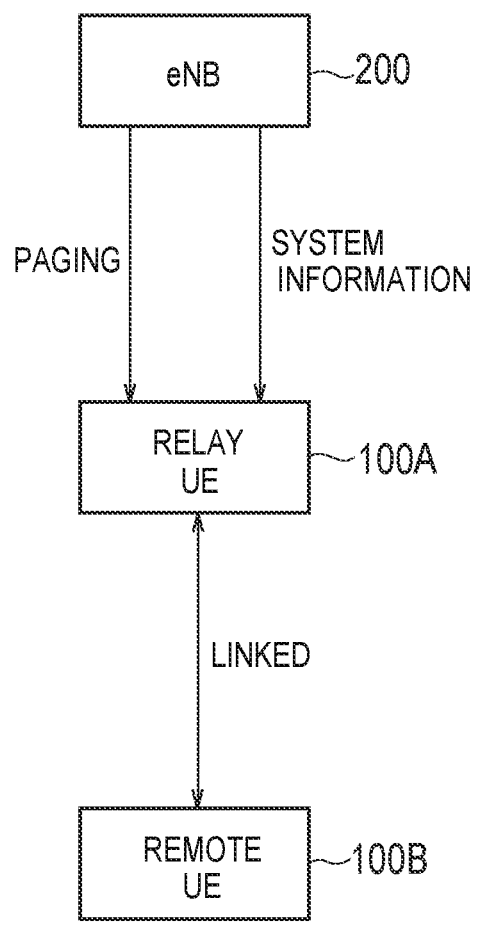
FIG. 6 is a diagram illustrating a relay function according to the embodiment.

A relay function (ProSe UE-to-Network Relay) according to an embodiment will be described. FIG. 6 is a diagram illustrating a relay function according to the embodiment.

As illustrated in FIG. 6, a relay UE 100A (relay radio terminal) provides connectivity with an eNB 200 (E-UTRAN 10) to a remote UE 100B (remote radio terminal) by using direct communication with the remote UE 100B. That is, the relay UE 100A relays communication between the eNB 200 and the remote UE 100B.

The relay UE 100A is located within a coverage area of the eNB 200. The relay UE 100A is in an idle mode (RRC Idle) or a connected mode (RRC Connected). In the embodiment, a case where the relay UE 100A is in the idle mode will be mainly assumed. However, when the relay UE 100A relays communication between the eNB 200 and the remote UE 100B, the relay UE 100A is in the connected mode. The relay UE 100A receives a paging message (Paging) and/or system information (System Information) from the eNB 200, and relays the paging message and/or the system information to the remote UE 100B.

The remote UE 100B is located outside the coverage area of the eNB 200 or within the coverage area. The remote UE 100B may be a wearable terminal worn by the user who holds the relay UE 100A. An end-to-end radio link is established between the remote UE 100B and the relay UE 100A. A state in which the end-to-end radio link is established is referred to as a linked state (Linked). The linked state is a state in which at least synchronization between the remote UE 100B and the relay UE 100A is established, and a state in which direct communication can be performed between the remote UE 100B and the relay UE 100A. The linked state may be a state in which an identifier of the remote UE 100B is registered in the relay UE 100A. The identifier of the remote UE 100B may be international mobile subscriber identity (IMSI).

A radio protocol between the relay UE 100A and the remote UE 100B is a side link protocol conforming to 3GPP (LTE) or a protocol conforming to a protocol different from 3GPP (LTE) (for example, Bluetooth (registered trademark), WiFi). The side link is an inter-UE interface defined by 3GPP. In the embodiment, a case where a side link protocol is used as a radio protocol between the relay UE 100A and the remote UE 100B will be mainly assumed.

(3) Paging Relay Operation

Paging relay operation according to the embodiment will be described.

(3.1) Overview of Paging Relay Operation

General paging (idle mode paging) will be described. The UE 100 in an idle mode performs discontinuous reception (DRX) operation to reduce power consumption. In the DRX operation, the UE 100 intermittently monitors a PDCCH to receive a paging message. A PDCCH monitoring timing in the UE 100 is determined based on an identifier (international mobile subscriber identity, IMSI) of the UE 100. The PDCCH monitoring timing (PDCCH monitoring subframe) in the DRX operation is referred to as paging occasion (PO). PO corresponds to a paging reception opportunity.

The UE 100 and the eNB 200 calculate the paging occasion (PO) and a paging frame (PF) which is a radio frame that may include the paging occasion as described below. A system frame number (SFN) of PF is obtained from Equation (1) described below.

$$\text{SFN mod } T = (T \text{ div } N)*(\text{UE\_ID mod } N) \qquad (1)$$

"T" is a DRX cycle of the UE 100 for monitoring paging, and is represented by the number of radio frames. Further, "T" is the smaller of a default DRX value broadcast by the eNB 200 using a system information block (SIB) and an UE-specific DRX value configured for the UE 100 using a NAS message. Note that, in a case where the UE-specific DRX value is not configured, the UE 100 applies the default DRX value to "T". Further, "N" is a minimum value of "T" and "nB". A value of nB is selected from 4T, 2T, T, T/2, T/4, T/8, T/16, and T/32. "UE_ID" is a value obtained by "IMSI mod 1024".

Among the PFs obtained in this way, a subframe number of a PO is obtained as described below. First, an index i_s is obtained by following Equation (2):

$$i\_s = \text{floor}(\text{UE\_ID}/N) \bmod Ns \qquad (2)$$

"Ns" is a maximum value of 1 and nB/T. Next, a PO corresponding to Ns and index i_s is obtained.

As described above, paging reception opportunities are not concentrated by making paging reception opportunities different according to a UE identifier (IMSI). The UE 100 decodes a PDCCH using a group identifier (P-RNTI) for paging in a subframe corresponding to a paging reception opportunity, and acquires paging channel allocation information. The UE 100 acquires a paging message based on the allocation information.

An overview of paging relay operation according to the embodiment will be described. In the embodiment, a network performs paging to call the remote UE 100B. A first paging scenario and a second paging scenario are assumed as a paging scenarios for calling the remote UE 100B. In each scenario, the remote UE 100B and the relay UE 100A are in the linked state.

FIG. 7 is a diagram illustrating the first paging scenario for calling the remote UE 100B.

As illustrated in FIG. 7, in the first paging scenario, the relay UE 100A in the idle mode monitors a paging message in both a paging reception opportunity (paging occasion for L2 relay UE) of itself and a paging reception opportunity (paging occasion for remote UE) of the remote UE 100B. In the first paging scenario, the MME 300 does not need to grasp a correspondence relation between the relay UE 100A and the remote UE 100B.

In Step S11, the MME 300 detects, for example, an incoming call to the remote UE 100B, and determines to call the remote UE 100B. The MME 300 transmits a paging message (S1AP Paging) addressed to the remote UE 100B to the eNB 200 over the S1 interface. For example, the MME 300 grasps a tracking area in which the remote UE 100B exists, and transmits the paging message (S1AP Paging) to one or a plurality of the eNBs 200 corresponding to the tracking area. The paging message (S1AP Paging) includes an identifier of the remote UE 100B as a call destination. The paging message (S1AP Paging) includes information (paging DRX) for the eNB 200 to identify a paging reception opportunity of the remote UE 100B.

In Step S12, the eNB 200 having received the paging message (S1AP Paging) identifies a paging reception opportunity of the remote UE 100B, and transmits a paging message (Paging for remote UE) addressed to the remote UE 100B at the identified paging reception opportunity. The paging message transmitted by the eNB 200 is a type of an RRC message. The paging message (Paging for remote UE) includes an identifier of the remote UE 100B as a call destination.

The relay UE 100A monitors paging messages in both the paging reception opportunity (Paging occasion for L2 relay UE) defined based on its own identifier and a paging reception opportunity (Paging occasion for remote UE) defined based on the identifier of the remote UE 100B. The relay UE 100A receives a paging message (Paging for remote UE) addressed to the remote UE 100B in a paging reception occasion (Paging occasion for remote UE).

In Step S13, the relay UE 100A relays paging to the remote UE 100B (Paging over short range link). Specifically, the relay UE 100A transmits, to the remote UE 100B, paging information indicating that the remote UE 100B has been called. The remote UE 100B determines that it has been called in response to the reception of the paging information.

FIG. 8 is a diagram illustrating the second paging scenario for calling the remote UE 100B. Description is omitted for operation overlapping with the first paging scenario.

As illustrated in FIG. 8, in the second paging scenario, the relay UE 100A in the idle mode monitors a paging message only in its own paging reception opportunity (Paging occasion for L2 relay UE). In the second paging scenario, the MME 300 needs to grasp a correspondence relation between the relay UE 100A and the remote UE 100B. Specifically, the MME 300 maps the paging reception opportunity of the remote UE 100B to the paging reception opportunity of the relay UE 100A.

In Step S21, the MME 300 detects, for example, an incoming call to the remote UE 100B, and determines to call the remote UE 100B. The MME 300 transmits a paging message (S1AP Paging) addressed to the remote UE 100B to the eNB 200 over the S1 interface. The paging message (S1AP Paging) includes an identifier of the remote UE 100B as a call destination. The paging message (S1AP Paging) includes information (paging DRX) for the eNB 200 to identify the paging reception opportunity of the relay UE 100A to which the paging reception opportunity of the remote UE 100B is mapped.

In Step S22, the eNB 200 having received the paging message (S1AP Paging) identifies a paging reception opportunity of the relay UE 100A. The eNB 200 transmits a paging message (Paging for remote UE) addressed to the remote UE 100B in the identified paging reception opportunity. The paging message (Paging for remote UE) includes an identifier of the remote UE 100B as a call destination.

The relay UE 100A monitors a paging message in a paging reception opportunity (Paging occasion for L2 relay UE) defined based on its own identifier (IMSI). The relay UE 100A receives a paging message (Paging for remote UE) addressed to the remote UE 100B.

In Step S23, the relay UE 100A relays the paging to the remote UE 100B (Paging over short range link). The remote UE 100B determines that it has been called in response to the reception of the paging information from the relay UE 100A.

(3.2) Paging Relay Operation in Idle Mode

The paging relay operation in the idle mode according to the embodiment will be described.

(3.2.1) First Paging Relay Operation in Idle Mode

The first paging relay operation in the idle mode according to the embodiment is operation assuming a case in which not only the remote UE 100B but also the relay UE 100A is simultaneously called in the second paging scenario described above.

FIG. 9 is a diagram illustrating the first paging relay operation in the idle mode according to the embodiment. The relay UE 100A and the remote UE 100B are in the idle mode. Further, the relay UE 100A and the remote UE 100B are in the linked state. The relay UE 100A monitors a paging message only in its own paging reception opportunity. The MME 300 grasps a correspondence relation between the relay UE 100A and the remote UE 100B. The MME 300 maps the paging reception opportunity of the remote UE 100B to the paging reception opportunity of the relay UE 100A based on the grasped correspondence relation.

As illustrated in FIG. 9, in Step S101, the MME 300 detects, for example, both an incoming call to the remote UE 100B and an incoming call to the relay UE 100A, and determines to call both the remote UE 100B and the relay UE 100A. The MME 300 transmits, to the eNB 200, a paging message (PAGING w/one for Remote UE) addressed to the remote UE 100B and the relay UE 100A on the S1 interface. The paging message includes an identifier of the remote UE 100B as a call destination. The paging message includes information (paging DRX) for the eNB 200 to identify the paging reception opportunity of the relay UE 100A to which the paging reception opportunity of the remote UE 100B is mapped. The paging message may further include an identifier of the relay UE 100A as a call destination. The paging message may further include an indicator indicating that the relay UE 100A is also called.

Alternatively, the MME 300 may further transmit a paging message addressed to the relay UE 100A to the eNB 200 separately from the paging message addressed to the remote UE 100B. In this case, a normal message format may be applied to the paging message addressed to the relay UE 100A, and a new message format may be applied to the paging message addressed to the remote UE 100B.

In Step S102, the eNB 200 that has received the paging message from the MME 300 identifies the paging reception opportunity of the relay UE 100A. The eNB 200 transmits a paging message (PAGING w/one for Remote UE) addressed to the remote UE 100B and the relay UE 100A in the identified paging reception opportunity. The paging message includes an identifier of the remote UE 100B as a call destination. The paging message further includes an identifier of the relay UE 100A as a call destination. The paging message may further include an indicator indicating that the relay UE 100A is also called. Alternatively, the eNB 200 may further transmit a paging message addressed to the relay UE 100A separately from the paging message addressed to the remote UE 100B. In this case, a normal message format may be applied to the paging message addressed to the relay UE 100A, and a new message format may be applied to the paging message addressed to the remote UE 100B.

FIG. 10 is a diagram illustrating a configuration example of a paging message transmitted by the eNB 200. Here, an example in which a normal paging message is expanded to constitute a paging message addressed to the remote UE 100B will be described.

As illustrated in FIG. 10, a paging message (Paging) includes "PagingRecordList" which is a list of identifiers of call destination UEs. "PagingRecordList" includes information (PagingRecord) of UE identifiers as many as from 1 to "maxPageRec". In the embodiment, "PagingRecord" includes an identifier (remoteUE-Identity) of the remote UE 100B in addition to an identifier (ue-Identity) of the relay UE 100A. The identifier "remoteUE-Identity" is an information element (IE) newly added to a normal paging message. The identifier "remoteUE-Identity" may be in the form of a list including a plurality of UE identifiers.

The paging message including "remoteUE-Identity" means that it needs to be relayed by the relay UE 100A to the remote UE 100B. Further, in the paging message including "remoteUE-Identity", "ue-Identity" indicates the relay UE 100A that is to relay the paging message. However, "ue-Identity" does not need to be included in the paging message. However, in a case where "ue-Identity" is not included in the paging message, all relay UEs that receive the paging message may perform paging relay regardless of whether or not they are in the linked state. Therefore, in order to save radio resources and UE power consumption, the paging message including "remoteUE-Identity" desirably includes an identifier (ue-Identity) of the relay UE 100A that is to relay the paging message.

The relay UE 100A that receives the paging message including "remoteUE-Identity" determines to relay the paging message. However, in a case where "remoteUE-Identity" is included in the paging message, the relay UE 100A cannot determine whether itself is also called. In the embodiment, in order to indicate to the relay UE 100A that not only the remote UE 100B but also the relay UE 100A is called, "remoteUE-Identity" further includes the identifier of the relay UE 100A. Alternatively, in addition to "remoteUE-Identity", an indicator (relayUE-Paging=True) indicating that the relay UE 100A is also called is included in the paging message. "RelayUE-Paging" is an information element (IE) newly added to a normal paging message.

Alternatively, instead of extending the normal paging message, a paging message addressed to the remote UE different from the normal paging message may be specified. The eNB 200 transmits a paging message addressed to the relay UE 100A separately from the paging message addressed to the remote UE 100B. In this case, the relay UE 100A needs to consider the possibility that these two paging messages are transmitted in one paging reception opportunity. In order to distinguish these two paging messages, for example, P-RNTI used for receiving a paging message addressed to the remote UE may be configured separately from P-RNTI used for receiving a normal paging message. Special P-RNTI used to receive a paging message addressed to the remote UE may be notified from the eNB 200 to the relay UE 100A, or a value defined by the specifications may be configured for the relay UE 100A in advance. Returning to FIG. 9, the relay UE 100A receives a paging message including the identifier of the remote UE 100B as a call destination from the eNB 200 in its paging reception opportunity (Step S102).

In Step S103, in response to the reception of the paging message, the relay UE 100A determines whether not only the remote UE 100B but also the relay UE 100A is called. In a case where at least one of conditions 1 to 3 described below is satisfied, the relay UE 100A determines that not only the remote UE 100B but also the relay UE 100A is called.

Condition 1: The identifier of the relay UE 100A is also included in the paging message as a call destination. For example, in a case where "remote UE-Identity" further includes the identifier of the relay UE 100A, the relay UE 100A determines that not only the remote UE 100B but also the relay UE 100A is called.

Condition 2: An indicator indicating that the relay UE 100A is also called is included in the paging message. For example, in a case where "relayUE-Paging=True" is included in the paging message, the relay UE 100A determines that not only the remote UE 100B but also the relay UE 100A is called.

Condition 3: Another paging message including the identifier of the relay UE 100A as a call destination is received in the paging reception opportunity. For example, in a case of receiving the paging message addressed to the relay UE 100A separately from the paging message addressed to the remote UE 100B, the relay UE 100A determines that not only the remote UE 100B but also the relay UE 100A is called.

In a case where not only the remote UE 100B but also the relay UE 100A is called (Step S103: Yes), in Step S104, the relay UE 100A transmits a connection request message (RRC Connection Request) to the eNB 200 to transition from the idle mode to the connected mode. In a case where the relay UE 100A is in the idle mode and in a suspended state, the relay UE 100A may transmit a connection recovery request message (RRC Connection Resume Request) to the eNB 200 instead of the connection request message (RRC Connection Request). The RRC layer of the relay UE 100A may notify a fact that there is a call to a layer (such as an NAS layer) higher than the RRC layer. The relay UE 100A may transmit a paging response message to the MME 300 using NAS signaling after transitioning to the connected mode. As described above, in a case of determining that not only the remote UE 100B but also the relay UE 100A is called, the relay UE 100A performs processing to respond to the paging message. Then, the relay UE 100A advances the processing to Step S105.

In a case where it is determined that only the remote UE 100B is called (Step S103: No), the relay UE 100A performs processing of Step S105 without performing the processing of responding to the paging message (processing relating to Step S104). In Step S105, the relay UE 100A transmits paging information (Paging for Remote UE) to the remote UE 100B. The remote UE 100B determines that it has been called in response to the reception of the paging information from the relay UE 100A. Paging information transmitted from the remote UE 100B to the relay UE 100A includes an identifier of the relay UE 100A. As an identifier, for example, IMSI, S-TMSI (SAE Temporary Mobile Subscriber Identity), "Destination ID" of a side link, a MAC address of WLAN (WiFi), an identifier for Bluetooth (registered trademark), an IP address, and the like can be used. A similar configuration of paging information can be used in operation described later.

The present sequence describes an example in which an indicator (relayUE-Paging=True) indicating that the relay UE 100A is also called is included in a paging message in order for the relay UE 100A to determine whether not only the remote UE 100B but also the relay UE 100A is called. As a modified example, the eNB 200 (and the MME 300) may include an indicator (remoteUE-Paging-only=True) indicating that only the remote UE 100B is called in the paging message. In the modified example, the relay UE 100A that receives the paging message may determine that not only the remote UE 100B but also the relay UE 100A is called in a case where the indicator (remoteUE-Paging-only=True) indicating that only the remote UE 100B is called is not included in the paging message. On the other hand, in a case where the indicator (remoteUE-Paging-only=True) indicating that only the remote UE 100B is called is included in the paging message, the relay UE 100A may determine that only the remote UE 100B is called.

Note that the sequence of FIG. 9 assumes the case where the relay UE 100A receives a paging message addressed to the remote UE 100B. However, a case where the relay UE 100A receives a paging message addressed only to the relay UE 100A may also be assumed. In this case, a paging message transmitted by the eNB 200 (and the MME 300) may include an indicator (for example, relayUE-Paging-only=True) indicating that only the relay UE 100A is called. The relay UE 100A that receives the paging message including "relayUE-Paging-only=True" determines that the relay UE 100A is called instead of the remote UE 100B.

(3.2.2) Second Paging Relay Operation in Idle Mode

The second paging relay operation in the idle mode according to the embodiment is operation assuming that only the remote UE 100B is called in the first paging scenario or the second paging scenario described above. The second paging relay operation may be or does not need to be used in combination with the first paging relay operation described above.

FIG. 11 is a diagram illustrating second paging relay operation in the idle mode according to the embodiment. The relay UE 100A and the remote UE 100B are in the idle mode. Further, the relay UE 100A and the remote UE 100B are in the linked state.

As illustrated in FIG. 11, processing of Step S111 is similar to the operation described above (see Step S11 of FIG. 7, Step S21 of FIG. 8, and Step S101 of FIG. 9).

Further, processing of Step S112 is similar to the operation described above (see Step S12 of FIG. 7, Step S22 of FIG. 8, and Step S102 of FIG. 9).

In Step S113, the relay UE 100A that receives a paging message addressed to the remote UE 100B transmits, to the remote UE 100B, paging information (Paging for Remote UE) indicating that the remote UE 100B is called. The remote UE 100B determines that it has been called in response to the reception of the paging information from the relay UE 100A.

In Step S114, the remote UE 100B transmits, to the relay UE 100A, response information that responds to the paging information. The response information may be a connection request (RRC Connection Request) from the remote UE 100B. Alternatively, the response information may be information that requests the relay UE 100A to transition to the connected mode.

In Step S115, the relay UE 100A determines whether or not response information has been received from the remote UE 100B. The relay UE 100A may start a timer at the time of transmitting the paging information (Paging for Remote UE), and may wait for reception of response information until the timer expires. The relay UE 100A may determine not to receive the response information from the remote UE 100B in a case of not receiving the response information during operation of the timer. A value (threshold) of the timer may be configured for the relay UE 100A by the eNB 200 and/or the MME 300. The value of the timer may be notified to the relay UE 100A by a paging message (S111 and/or S112), a notification message (for example, SIB) from the eNB 200, or NAS signaling (for example, Attach Accept) from the MME 300.

In a case of receiving the response information from the remote UE 100B (Step S115: Yes), in Step S116, the relay UE 100A transmits a connection request message (RRC Connection Request) to the eNB 200 in order to transition from the idle mode to the connected mode. In a case where the relay UE 100A is in the idle mode and in a suspended state, the relay UE 100A may transmit a connection recovery request message (RRC Connection Resume Request) to the eNB 200 instead of the connection request message (RRC Connection Request). The relay UE 100A may transmit (or relay) a paging response message of the remote UE 100B to the MME 300 using NAS signaling after transitioning to the connected mode.

On the other hand, in a case of not receiving the response information from the remote UE 100B (Step S115: No), the relay UE 100A maintains the idle mode without performing the processing of transitioning to the connected mode (processing related to Step S116).

As described above, in a case where only the remote UE 100B is called, the relay UE 100A transitions to the connected mode after receiving the response information from the remote UE 100B. In a case of not receiving the response information from the remote UE 100B, the relay UE 100A maintains the idle mode, so as to prevent wasting of the processing of transitioning to the connected mode.

Note that, the sequence of FIG. 11 assumes a case where the relay UE 100A is in the idle mode. However, in a case where the relay UE 100A has already been in the connected mode (or in a case where the relay UE 100A has been executing the processing of transitioning to the connected mode) at the time point of receiving the response information, the relay UE 100A does not need to perform the processing of transitioning to the connected mode again.

Further, the sequence of FIG. 11 assumes the case of paging, that is, a mobile terminated (MT) call. However, a case of transmission started by the remote UE 100B, that is, a mobile originated (MO) call may be assumed. In this case, the relay UE 100A may transmit a connection request (for example, RRC Connection Request) to the eNB 200 in response to detection of a connection request (for example, RRC Connection Request) from the remote UE 100B to the eNB 200.

(3.3) Paging Relay Operation in Connected Mode

The paging relay operation in the connected mode according to the embodiment will be described. The paging relay operation in the connected mode according to the embodiment is operation assuming a case where the relay UE 100A is in the connected mode in the first paging scenario or the second paging scenario described above.

FIG. 12 is a diagram illustrating paging relay operation in the connected mode according to the embodiment. The relay UE 100A is in the connected mode and the remote UE 100B is in the idle mode. Further, the relay UE 100A and the remote UE 100B are in the linked state.

As illustrated in FIG. 12, in Step S121, the relay UE 100A in the connected mode determines a paging reception opportunity (paging occasion) for the idle mode. In the first paging scenario, the relay UE 100A uses an identifier (for example, IMSI) of the remote UE 100B to determine a paging reception opportunity for the idle mode. In the second paging scenario, the relay UE 100A uses its identifier (for example, IMSI) to determine the paging reception opportunity for the idle mode.

Note that a general connected mode UE monitors a paging message at a timing unrelated to a UE identifier. Specifically, a general connected mode UE receives a paging message at least once in a case where a modification boundary of system information is exceeded, in order to determine whether or not the system information has been updated. In other words, a general connected mode UE receives a paging message at least once within a modification period of system information. These receiving timings are timings unrelated to a UE identifier. Further, in a case where ETWS/CMAS is configured, the connected mode UE receives a paging message at least once during a default DRX value (default paging cycle) in order to determine whether or not ETWS/CMAS is transmitted.

In Step S122, the relay UE 100A receives a paging message addressed to the remote UE 100B from the eNB 200 by monitoring the paging message in the paging reception opportunity determined in Step S121.

In Step S123, the relay UE 100A transmits paging information (Paging for Remote UE) to the remote UE 100B in response to the reception of the paging message addressed to the remote UE 100B. The remote UE 100B determines that it has been called in response to the reception of the paging information from the relay UE 100A.

(4) System Information Relay Operation

The system information relay operation according to the embodiment will be described. System information (system information block, SIB) is information that the eNB 200 repeatedly broadcasts, and includes various types of information (for example, SIB type 1 to type 21). Therefore, it is not preferable to relay all system information from the relay UE 100A to the remote UE 100B.

The relay UE 100A according to the embodiment receives system information broadcast from the eNB 200. The relay UE 100A determines whether or not to relay information included in the system information to the remote UE 100B. The relay UE 100A determines to relay the information included in the system information to the remote UE 100B in a case where at least one of conditions A to C described below is satisfied.

Condition A: The relay UE 100A establishes to establish an end-to-end radio link in a state where no end-to-end radio link is established between the relay UE 100A and the remote UE 100B.

Condition B: The relay UE 100A detects an update of system information in a state where an end-to-end radio link is established.

Condition C: The relay UE 100A receives a system information relay request from the remote UE 100B in a state where an end-to-end radio link is established.

Further, in the embodiment, the relay UE 100A may select information to be relayed to the remote UE 100B among information included in the system information based on at least one of a notification from the remote UE 100B, a request from the remote UE 100B, and a radio protocol between the relay UE 100A and the remote UE 100B. The relay UE 100A relays only the selected information among the information included in the system information to the remote UE 100B.

(4.1) First Operation Example

In a first operation example, the relay UE 100A relays system information to the remote UE 100B only when the relay UE 100A establishes an end-to-end radio link in a state where no end-to-end radio link is established between the relay UE 100A and the remote UE 100B.

FIG. 13 is a diagram illustrating the first operation example of the system information relay operation according to the embodiment. The first operation example assumes a state where no end-to-end radio link is established between the relay UE 100A and the remote UE 100B. That is, the relay UE 100A and the remote UE 100B are not in the linked state. Further, a radio protocol between the relay UE 100A and the remote UE 100B is assumed to be a side link direct communication protocol conforming to 3GPP (LTE). Furthermore, the remote UE 100B is assumed to be located out of a coverage area of the eNB200. Therefore, the remote UE 100B cannot receive system information from the eNB 200.

As illustrated in FIG. 13, in Step S201, the relay UE 100A determines whether or not to establish an end-to-end radio link with the remote UE 100B. The RRC layer of the relay UE 100A may determine whether or not to establish an end-to-end radio link with the remote UE 100B based on an instruction of an upper layer (such as an NAS layer). The state instructed by the upper layer to establish the end-to-end radio link with the remote UE 100B may be expressed as "interested in the linked state". For example, the user who holds the relay UE 100A performs operation for establishing an end-to-end radio link with the remote UE 100B by manual operation. The relay UE 100A determines to establish an end-to-end radio link with the remote UE 100B in response to the operation.

In a case where it is determined that the end-to-end radio link is established with the remote UE 100B (Step S201: Yes), in Step S202, the relay UE 100A receives system information for establishing the end-to-end radio link with the remote UE 100B from the eNB 200. The system information includes information indicating a radio resource (resource pool) used to establish an end-to-end radio link and/or a setting used to establish an end-to-end radio link. The system information may be at least one of SIB type 18, which is system information on side link direct communication of 3GPP (LTE), SIB type 19, which is system information on side link direct discovery of 3GPP (LTE), and SIB type 21, which is system information on side link V2X (vehicle to everything) communication of 3GPP (LTE).

Note that the relay UE 100A may perform the processing of Step S202 before Step S201. In this case, in a case of confirming that the system information acquired before Step S201 is latest system information, the relay UE 100A does not need to acquire the system information again after Step S201.

In Step S203, the relay UE 100A relays (transmits) information included in the system information to the remote UE 100B. The relay UE 100A may relay only part of information without relaying all the information included in the system information. For example, the relay UE 100A may transmit, to the remote UE 100B, information indicating part of radio resources in one or a plurality of resource pools indicated by the system information. In this case, establishment of an end-to-end radio link is performed using only a limited radio resource in the resource pool. Alternatively, the relay UE 100A may transmit all information included in the latest system information to the remote UE 100B. The relay UE 100A may repeatedly perform processing of Step S203 in a predetermined period (for example, a period until the processing of establishing an end-to-end radio link is started).

In a case of determining to establish an end-to-end radio link with the relay UE 100A, the remote UE 100B performs processing of receiving system information relayed (transmitted) from the relay UE 100A. The remote UE 100B may perform a search across all frequencies because it is unknown which radio resource (frequency) is used to transmit system information from the relay UE 100A. Alternatively, the remote UE 100B may store information on radio resources used for transmitting system information in the past, and may search for the radio resources preferentially.

The RRC layer of the remote UE 100B may determine whether or not to establish an end-to-end radio link with the relay UE 100A based on an instruction of an upper layer (such as a NAS layer). The state instructed by the upper layer to establish the end-to-end radio link with the relay UE 100A may be expressed as "interested in the linked state". For example, the user who holds the remote UE 100B performs operation for establishing an end-to-end radio link with the relay UE 100A by manual operation. In response to the operation, the remote UE 100B determines to establish an end-to-end radio link with the relay UE 100A. Alternatively, the remote UE 100B may determine to establish an end-to-end radio link with the relay UE 100A in a case of determining that it is located outside a coverage area of the eNB 200, and/or in a case of determining that it cannot hold (acquire) latest system information.

In Step S204, the remote UE 100B and the relay UE 100A perform processing of establishing an end-to-end radio link based on the system information. Specifically, the remote UE 100B determines a radio resource to be used for transmission to the relay UE 100A based on the system information received from the relay UE 100A. The remote UE 100B transmits a signal and/or a message for establishing an end-to-end radio link to the relay UE 100A using the determined radio resource. The relay UE 100A receives a signal and/or a message from the remote UE 100B using the radio resource notified to the remote UE 100B. In a case where the relay UE 100A transmits only part of system information to the remote UE 100B, the remote UE 100B may acquire all system information from the relay UE 100A in the linked state after an end-to-end radio link is established.

(4.2) Second Operation Example

In a second operation example, the relay UE 100A notifies the remote UE 100B of an update of system information and/or relays the system information, only when the system information to be relayed to the remote UE 100B is updated.

Figure 14:
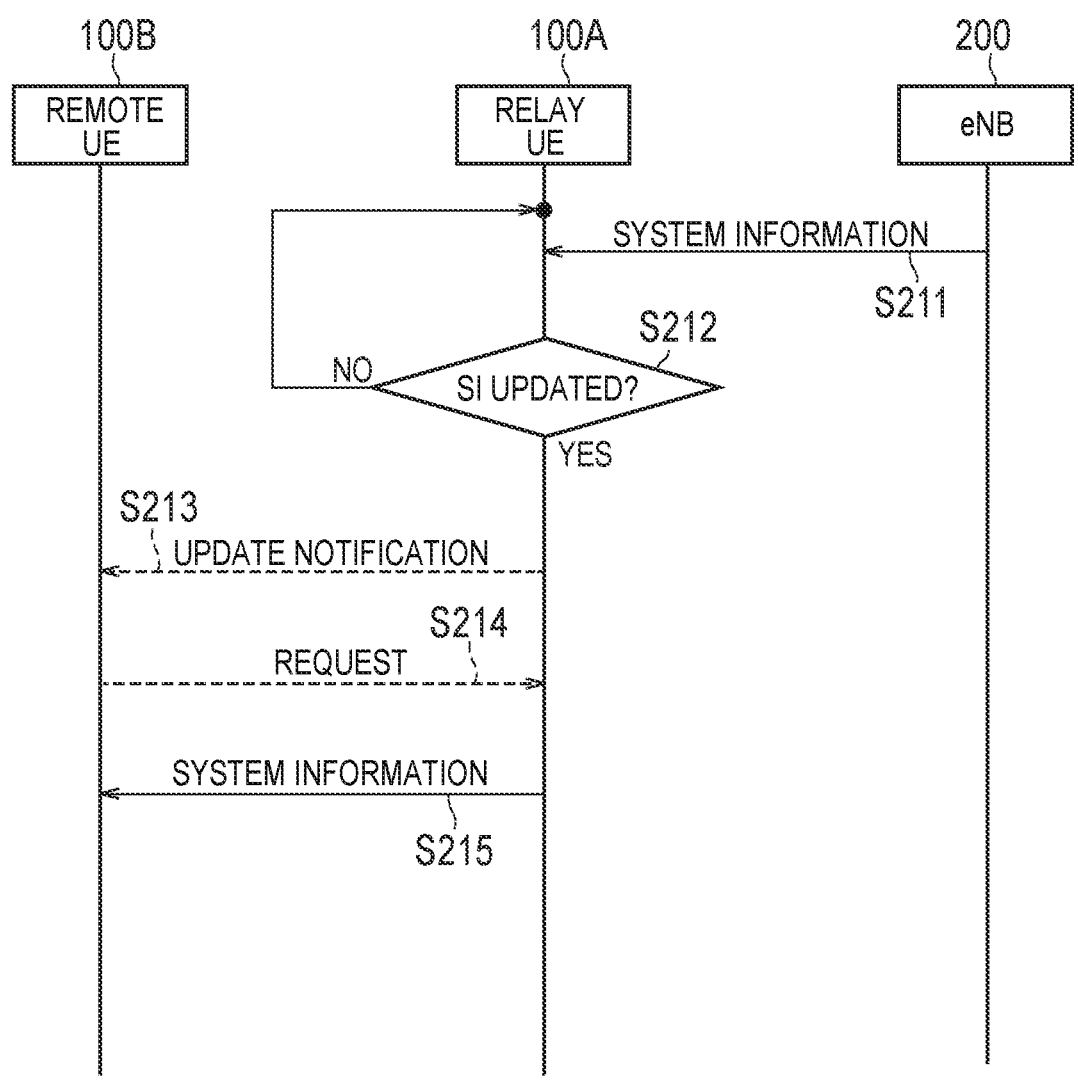
FIG. 14 is a diagram illustrating a second operation example of the system information relay operation according to the embodiment.

FIG. 14 is a diagram illustrating the second operation example of the system information relay operation according to the embodiment. The second operation example assumes a state (the linked state) where an end-to-end radio link is established between the relay UE 100A and the remote UE 100B. In the second operation example, a radio protocol between the relay UE 100A and the remote UE 100B may be a side link direct communication protocol conforming to 3GPP (LTE).

As illustrated in FIG. 14, in Step S211, the relay UE 100A receives, from the eNB 200, system information to be relayed to the remote UE 100B. The system information to be relayed to the remote UE 100B may be system information of any of SIB type 1 to type 21. A type of the system information to be relayed to the remote UE 100B may be notified in advance from the remote UE 100B to the relay UE 100A (see a third operation example described later).

In Step S212, the relay UE 100A determines whether or not the system information received in Step S211 is updated system information. The relay UE 100A may determine the update of the system information based on tag information (Value Tag) corresponding to the system information received in Step S211. The tag information (Value Tag) is a value updated according to the update of the system information. When tag information (Value Tag) is provided from the eNB 200 for each type of system information, the relay UE 100A can grasp which system information has been updated based on the tag information (Value Tag). Further, the remote UE 100B may notify the relay UE 100A of the tag information (Value Tag) of system information currently held. The relay UE 100A may check whether or not the remote UE 100B holds latest system information, based on the tag information (Value Tag) notified from the remote UE 100B.

Alternatively, the relay UE 100A may store system information received in the past, and compare latest system information among the stored system information with newly received system information. If there is a difference as a result of the comparison, the relay UE 100A determines that the newly received system information is updated. If there is no difference, the relay UE 100A determines that the newly received system information is not updated.

In a case of determining that the update of the system information to be relayed to the remote UE 100B is detected (Step S212: Yes), in Step S213, the relay UE 100A transmits a notification (update notification) indicating the update of the system information to the remote UE 100B. The remote UE 100B determines whether or not to request relay of system information based on the notification (update notification). Here, the description will proceed by assuming that the remote UE 100B determines to request relay of system information.

In Step S214, the remote UE 100B transmits a relay request (Request) for system information to the relay UE 100A. The relay UE 100A determines to relay the system information to the remote UE 100B in response to the reception of the relay request (Request). However, the processing of Steps S213 and S214 are not essential and may be omitted.

In Step S215, the relay UE 100A relays the system information received in Step S211 to the remote UE 100B.

(4.3) Third Operation Example

In the third operation example, the relay UE 100A relays only the selected information among the information included in the system information to the remote UE 100B. The second operation example may be combined with the first or second operation example.

FIG. 15 is a diagram illustrating the third operation example of the system information relay operation according to the embodiment. The third operation example assumes a state (the linked state) where an end-to-end radio link is established between the relay UE 100A and the remote UE 100B. In the third operation example, a radio protocol between the relay UE 100A and the remote UE 100B may be a side link protocol conforming to 3GPP (LTE) or may be a protocol conforming to a protocol different from 3GPP (LTE) (for example, Bluetooth (registered trademark)).

As illustrated in FIG. 15, in Step S221, the remote UE 100B sends a notification or request to the relay UE 100A. For example, the remote UE 100B may notify the relay UE 100A whether or not the system information relaying is necessary. Such notification about whether the necessity is present may be performed for each type of system information. The remote UE 100B may request the relay UE 100A to relay a particular type of system information (for example, SIB type 18 and the like). The remote UE 100B may notify the relay UE 100A whether or not the remote UE 100B is within a coverage area of the eNB 200. When the remote UE 100B is within the coverage area, the relay UE 100A may determine that relay of the system information is unnecessary because the remote UE 100B can receive the system information directly from the eNB 200. The remote UE 100B may transmit a notification (MBMS Interest Indication) indicating that it is interested in MBMS reception to the relay UE 100A. The relay UE 100A may determine that it is necessary to relay system information (for example, SIB type 13/15/20) related to an MBMS to the remote UE 100B in response to the reception of the notification (MBMS Interest Indication).

In Step S222, the relay UE 100A selects system information to be relayed to the remote UE 100B. The relay UE 100A may select system information to be relayed to the remote UE 100B based on the notification or request in Step S211. The relay UE 100A may autonomously select system information to be relayed to the remote UE 100B based on a radio protocol between the relay UE 100A and the remote UE 100B. In a case where the radio protocol is a side link protocol of 3GPP (LTE), the relay UE 100A selects system information (for example, system information B18/19/21) on a side link. On the other hand, when the radio protocol is a non-3 GPP protocol (for example, Bluetooth (registered trademark), WiFi, and the like), the relay UE 100A may select system information (for example, SIB type 2) on access control without selecting the system information on the side link.

In Step S223, the relay UE 100A receives, from the eNB 200, system information to be relayed to the remote UE 100B. The order of the processing of Step S223 and the processing of Step S222 may be reversed. In this case, after temporarily storing all system information, the relay UE 100A selects system information to be relayed to the remote UE 100B from the stored system information.

In Step S224, the relay UE 100A relays only the system information selected in Step S222 to the remote UE 100B.

(5) Other Embodiments

The above embodiment describes an example in which the relay UE 100A in the connected mode monitors an idle mode paging message as the paging relay operation in the connected mode. However, in a case where the relay UE 100A is in the connected mode, the eNB 200 may transmit a paging message to the relay UE 100A using a radio resource scheduled for the relay UE 100A. Specifically, the eNB 200 may transmit a paging message as an RRC message or a MAC control element (MAC CE) to the relay UE 100A in an active period (monitoring period) of DRX for the connected mode, in a similar manner as in normal downlink transmission.

The above-described embodiment does not particularly mention individual configuration information (for example, UE individual RRC signaling) transmitted in unicast from the eNB 200 (or the MME 300) to the relay UE 100A (or the remote UE 100B). In order to optimize the UE individual configuration information, the relay UE 100A (or the remote UE 100B) may notify a network (the eNB 200 or MME 300) of a radio link protocol between the relay UE 100A and the remote UE 100B. The network may change the individual configuration information according to the notified link protocol. For example, in a case where a link is established by Bluetooth (registered trademark), the network can omit the setting specific to LTE and the setting specific to a side link. Further, the relay UE 100A (or the remote UE 100B) may notify the network of a link speed (throughput) between the relay UE 100A and the remote UE 100, and/or buffer capacity for relay transmission (that is, capacity of a buffer that stores data of the remote UE 100B in the relay UE 100A). The network may change resource allocation and/or bearer establishment for the relay UE 100A according to the notified link speed and/or buffer capacity. By adjusting a throughput in this way, effective use of radio resources and buffer overflow avoidance of the relay UE can be achieved.

The above embodiment does not particularly consider a light connected state. The light connected state is one state of the connected mode, and is a special state to which an idle mode procedure is applied. In the operation according to the above-described embodiment, the "idle mode" may be replaced with the "light connected state" and the "connected mode" may be replaced with a "normal connected mode (a state that is not the light connected state)".

The embodiment described above exemplifies an LTE system as a mobile communication system. However, the present disclosure is not limited to the LTE system. The operation according to the above-described embodiment may be applied to a mobile communication system (for example, the 5th generation mobile communication system) other than the LTE system. In the 5th generation mobile communication system, in addition to the connected mode and the idle mode, a new RRC state will be introduced. The new RRC state may be referred to as "RRC Inactive". Under such assumption, the "idle mode" in the operation according to the above-described embodiment may be replaced with an "RRC inactive mode".

The invention claimed is:

1. A relay radio terminal comprising a controller configured to perform a process for relaying communication between a base station and a remote radio terminal in a mobile communication system, wherein
in a state in which the relay radio terminal is in an idle mode and an end-to-end radio link between the relay radio terminal and the remote radio terminal is established, the controller is configured to perform:
a process of receiving, from the base station, a paging message including an identifier of the remote radio terminal as a call destination in a paging reception opportunity of the relay radio terminal, the identifier of the remote radio terminal is included in an information element of the paging message indicating that the paging message is relayed from the relay radio terminal to the remote radio terminal; and a process of determining whether not only the remote radio terminal but also the relay radio terminal is called, in response to reception of the paging message, wherein the controller is configured to determine that not only the remote radio terminal but also the relay radio terminal is called when one of the following conditions is satisfied:

an identifier of the relay radio terminal is also included in the information element of the paging message as a call destination;

an indicator indicating that the relay radio terminal is also called is included in the paging message; and another paging message including an identifier of the relay radio terminal as a call destination is further received in the paging reception opportunity, and when the relay radio terminal is in the idle mode, the controller is configured to further perform:

a process of transmitting, to the remote radio terminal, paging information indicating that the remote radio terminal is called in response to the reception of the paging message;

a process of receiving response information that responds to the paging information from the remote radio terminal; and a process of transitioning from the idle mode to a connected mode in response to the reception of the response information from the remote radio terminal.

2. The relay radio terminal according to claim 1, wherein in a state where the relay radio terminal is in a connected mode and the end-to-end radio link is established, the controller is configured to further perform a process of monitoring the paging message in a paging reception opportunity for an idle mode, wherein the paging reception opportunity for the idle mode is determined based on an identifier of the relay radio terminal or an identifier of the remote radio terminal.

\* \* \* \* \*